United States Patent
Handa et al.

(10) Patent No.: US 6,644,756 B1
(45) Date of Patent: Nov. 11, 2003

(54) WHEEL STRUCTURE

(75) Inventors: Akio Handa, Saitama (JP); Hideo Yanai, Saitama (JP); Bunzo Seki, Saitama (JP); Atsuko Yamaguchi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/166,606

(22) Filed: Jun. 12, 2002

(30) Foreign Application Priority Data

Jun. 19, 2001 (JP) .......................... 2001-185578

(51) Int. Cl.⁷ .......................... B60B 21/00; B60C 25/00
(52) U.S. Cl. ............... 301/95.101; 301/95; 301/63.103; 152/378 W
(58) Field of Search .......... 301/95.101, 95.104–95.109, 301/95.11, 95.102, 95.103, 99–103, 63.101, 63.103, 63.104, 63.106; 29/894.35; 152/378 W, 378 R, 379.3, 381.3, 381.4

(56) References Cited

U.S. PATENT DOCUMENTS

| | | | | |
|---|---|---|---|---|
| 446,189 A | * | 2/1891 | Overman ............... 301/95.105 |
| 1,566,017 A | * | 12/1925 | Jones ..................... 301/64.304 |
| 1,718,874 A | * | 6/1929 | Paull ....................... 301/95.105 |
| 1,809,605 A | * | 6/1931 | Sauzedde ............... 29/894.354 |
| 1,821,663 A | * | 9/1931 | Murray, Jr. et al. ........... 301/19 |
| 1,912,594 A | * | 6/1933 | Sauzedde ............... 301/95.105 |
| 2,083,326 A | * | 6/1937 | Eksergian .................. 301/5.1 |
| 2,099,410 A | * | 11/1937 | Ryerson ................. 301/95.102 |
| 2,162,735 A | * | 6/1939 | Lyon ..................... 29/894.324 |
| 2,873,785 A | * | 2/1959 | Howard ....................... 152/380 |
| 3,008,770 A | * | 11/1961 | Mueller ................. 301/95.106 |
| 3,228,097 A | * | 1/1966 | Tucker .................. 29/894.354 |
| 3,462,197 A | * | 8/1969 | Bajer ......................... 301/5.21 |
| 3,784,260 A | * | 1/1974 | Araya ................... 301/95.105 |
| 4,275,931 A | * | 6/1981 | Reppert .................. 301/35.57 |
| 4,286,825 A | * | 9/1981 | Sieving ................. 301/95.105 |
| 4,305,622 A | * | 12/1981 | Mitchell ...................... 301/58 |
| 4,351,382 A | * | 9/1982 | Corner et al. ............... 152/516 |
| 5,788,334 A | * | 8/1998 | Renard ...................... 301/5.24 |
| 6,244,668 B1 | * | 6/2001 | Hale et al. ............. 301/95.105 |
| 6,357,833 B1 | * | 3/2002 | Bajer .................... 301/95.101 |
| 6,367,883 B1 | * | 4/2002 | Chen ........................... 301/55 |
| 6,402,256 B1 | * | 6/2002 | Mercat .................. 301/95.104 |

FOREIGN PATENT DOCUMENTS

JP 62-71003 5/1987

* cited by examiner

*Primary Examiner*—S. Joseph Morano
*Assistant Examiner*—Long Bao Nguyen
(74) *Attorney, Agent, or Firm*—Birch, Stewart, Kolasch & Birch, LLP (57) ABSTRACT

A large-diameter part, the diameter of which is larger than the diameter in the center, is provided at the edges of a rim via parts having a difference in a level. Curled parts are provided on both edges of the rim by curling the large-diameter part. Each end face of the curled parts is touched to the parts having a difference in a level. The rigidity of the side of the edge of the rim can be enhanced by providing the parts having a difference in a level to the rim. As a result, the rigidity of the whole wheel can be enhanced and in addition, as a disc and the rim are not required to be thickened, the weight of the wheel can be prevented from being increased.

18 Claims, 6 Drawing Sheets

WHEEL STRUCTURE

BACKGROUND OF THE INVENTION

CROSS-REFERENCE TO RELATED APPLICATIONS

The present application claims priority under 35 USC 119 to Japanese Patent Application No. 2001-185578 filed on Jun. 19, 2001 the entire contents thereof is hereby incorporated by reference.

1. Field of the Invention

The present invention relates to a wheel structure for further enhancing the rigidity of the wheel.

2. Description of Background Art

A wheel structure of a vehicle, particularly an all-terrain vehicle, is set forth, for example, in Japanese Utility Model Publication No. Sho 62-71003, entitled "Minor-Diameter and Wide Wheel."

In FIGS. 1 and 2 of the above-mentioned publication, the minor-diameter and wide wheel in which discs 15a, 15b which are the respective bottoms of two cup-shaped rim halves 2A, 2B (characters and reference numbers used in the publication are used as they are) are united with the edges of these rim halves 2A, 2B, respectively, curled in the reverse shape of a U and with ears 11a, 11b being formed.

The minor-diameter and wide wheel is a wheel wherein the width, that is, the rim width of which (the distance between the inner surface 23 of the ear 11a and the inner surface 23 of the ear 11b) is large, compared with the diameter, for example, the outside diameters of beads 12a, 12b.

For such a wheel, it is estimated that when external force acts upon the wheel from a tire, the flexure of the side of each ear 11a, 11b becomes larger, compared with the flexure of the side of each disc 15a, 15b because the distance from each disc 15a, 15b, respectively, attached to the side of a vehicle body to each bead 12a, 12b for holding a tire is large. Therefore, it is desirable that the rigidity of the side of the ears 11a, 11b is higher. However, in the case where the rim halves 2A, 2B are thickened to enhance the rigidity, the weight is increased.

SUMMARY AND OBJECTS OF THE INVENTION

It is an object of the present invention to provide a wheel structure wherein the rigidity of the wheel is enhanced without increasing the weight.

To achieve the object of the present invention a wheel is formed with a disc and a rim wherein a larger-diameter part, the diameter of which is larger than the diameter in the center, is provided at the edge of the rim via a part having a difference in a level. A curled part is provided on both edges of the rim by curling the larger-diameter part. The end of the curled part is in contact with the part having a difference in a level.

The part having a difference in a level is provided to the rim wherein the rigidity of the side of the edge of the rim can be enhanced. As a result, the rigidity of the whole wheel can be more enhanced.

The present invention includes a protrusion that is formed for reinforcement that protrudes inside a curled part.

As the protrusion for reinforcement is formed, the rigidity of a wheel can be more enhanced by a part having a difference in a level and a protrusion.

The present invention is based upon a wheel formed by a disc and a rim and includes a protrusion for reinforcement that is formed at both edges of a rim and a curled part that is formed at the edges.

As the protrusion for reinforcement is formed in the rim, the rigidity of both edges of the rim can be enhanced by a simple structure and as a result, the rigidity of the whole wheel can be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring to the attached drawings, embodiments of the invention will be described below.

Figure 1:
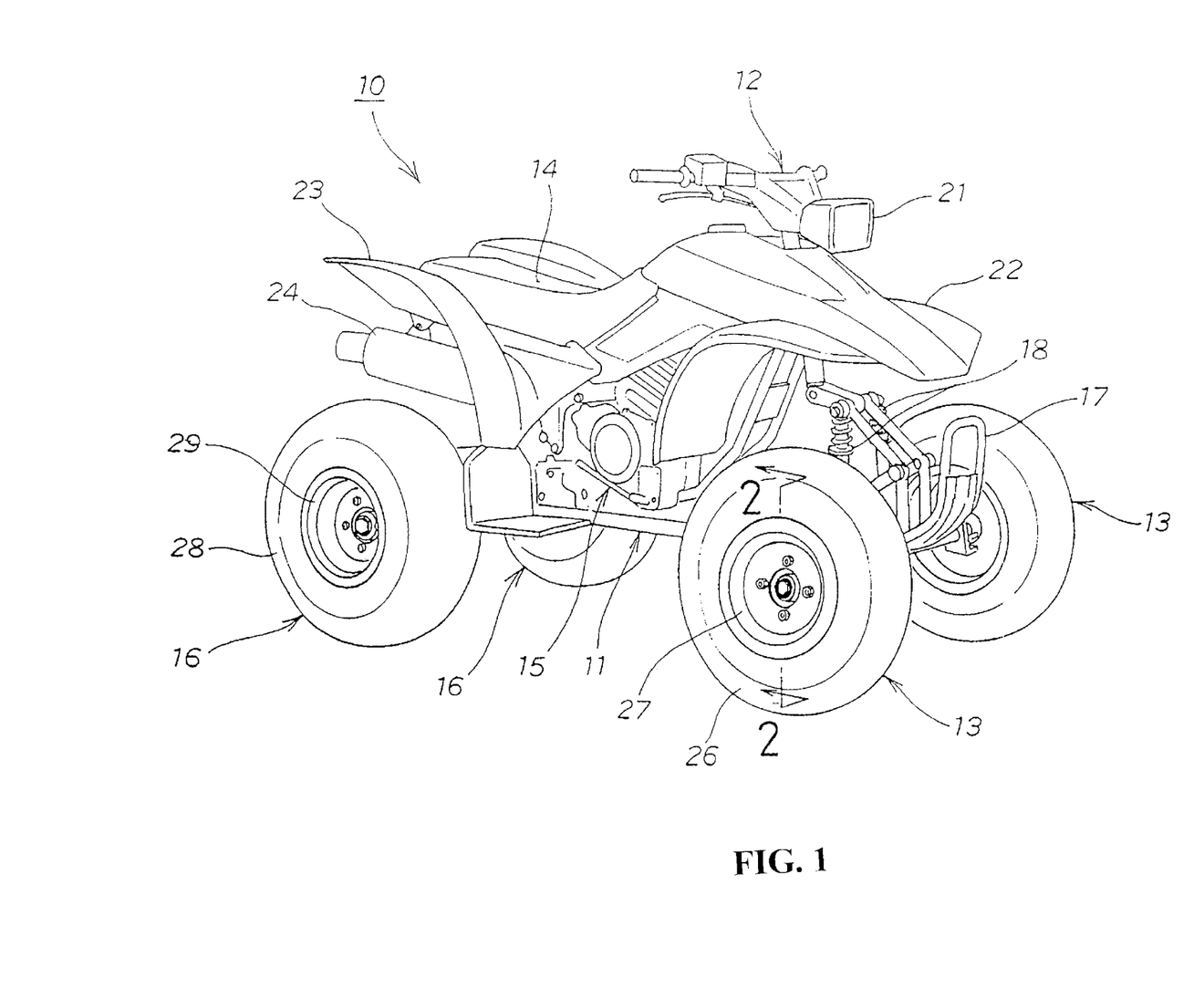
FIG. 1 is a perspective view showing a vehicle with a wheel structure according to a first embodiment of the present invention.

FIG. 1 is a perspective view showing a vehicle adopting wheel structure according to the invention (a first embodiment), and a buggy 10 as a vehicle is composed of a handlebar 12 attached to a vehicle body 11 for turning the handlebar. Front wheels 13, 13 are coupled to the handlebar 12 via a steering system not shown so that the front wheels can be steered. A seat 14 is attached on the body 11 with a power unit 15 including an engine and a transmission, respectively, arranged below the seat 14. Rear wheels 16, 16 are driven by the power unit 15. A bumper 17, a front suspension unit 18, 18, a head lamp 21, a front fender 22, a rear fender 23 and a muffler 24 are operatively connected to the vehicle body 11.

The front wheel 13 is composed of a tire 26 and a front wheel 27 having the wheel structure according to the present invention which is made of a light alloy or a steel plate. The rear wheel 16 is composed of a tire 28 and a rear wheel 29 having the wheel structure according to the present invention which is made of a light alloy or a steel plate.

The front wheel 27 and the rear wheel 29 may be the same or may be different in off-set, the diameter and the width of a rim. However, the wheels shall be identical in the basic structure according to the present invention.

Therefore, the front wheel 27 will be mainly described below.

The buggy 10 is a vehicle classified as an all terrain vehicle (ATV) with a small turning circle. The operation of the vehicle is easy because it is light and compact. The vehicle is an off-road vehicle suitable for movement with regard to agriculture, cattle breeding, hunting or may be used by a security guard or for leisure.

Figure 2:
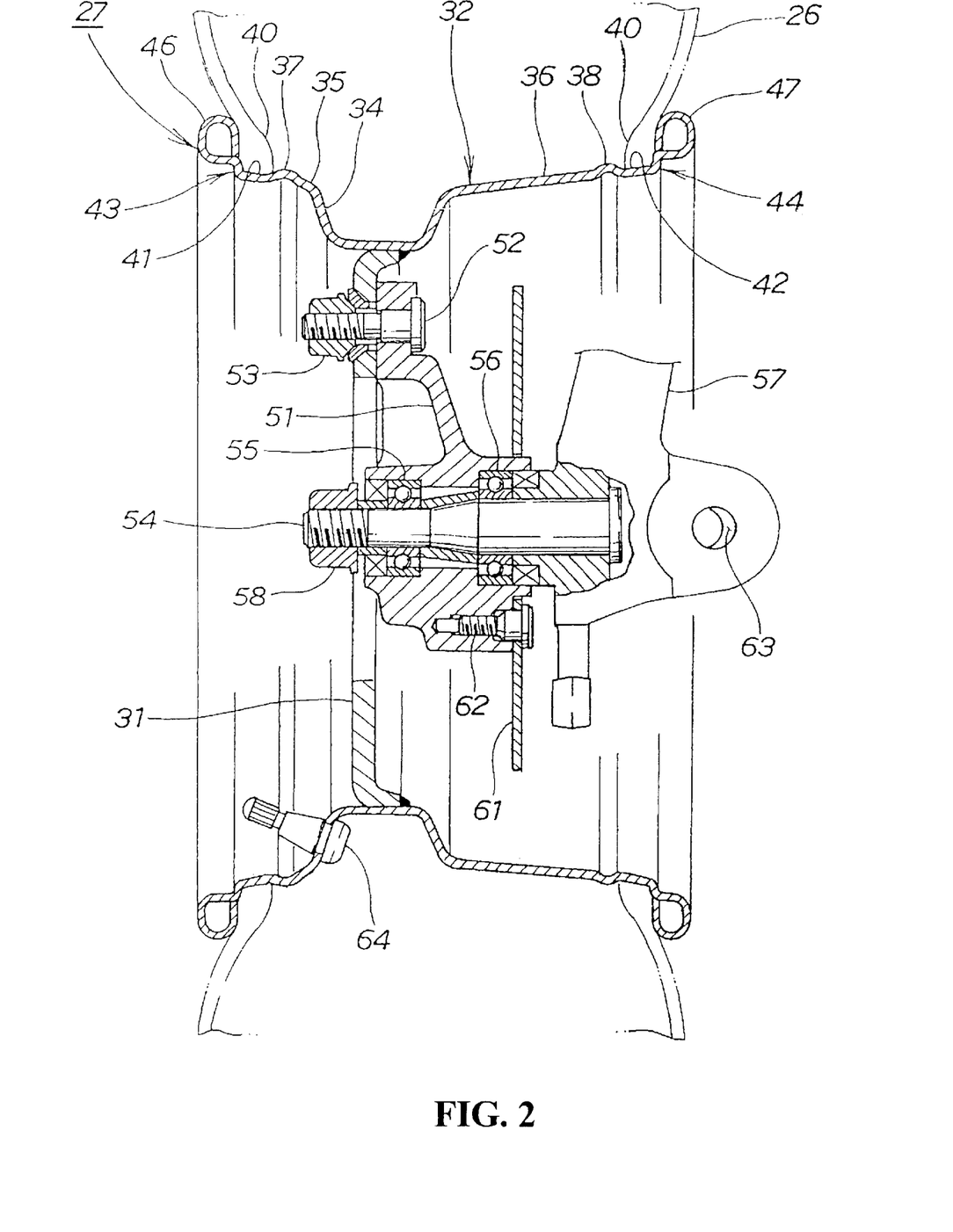
FIG. 2 is a sectional view taken along a line 2—2 in FIG. 1.

FIG. 2 is a sectional view viewed taken along a line 2—2 in FIG. 1. The front wheel 27 is a two-piece wheel composed of a disc 31 for attaching to the body side and a rim 32 substantially cylindrical and attached to the periphery of the disc 31.

The rim 32 is composed of a rim drop part 34 provided in the approximate center with tapered parts 35, 36 provided on both sides of the rim drop part 34. Humps 37, 38 are built at each end of the tapered parts 35, 36 with bead seats 41, 42, respectively, formed outside the humps 37, 38 to hold the inside of a bead 40 of the tire 26. Parts having a difference in a level 43, 44, respectively, are raised from these bead seats 41, 42, with an increase in the diameter of the rim and, respectively, extend in a direction of an axle with curled parts 46, 47 acquired by curling each end of these parts having a difference in a level 43, 44.

The rim drop part 34 is a part for fitting the bead 40 of the tire 26 when the tire 26 is attached or detached.

The humps 37, 38 are an annular convex portion for preventing the tire 26 from, respectively, slipping from the bead seats 41, 42.

The curled parts 46, 47 are parts provided to enhance the rigidity of the end of the front wheel 27 wherein the parts having a difference in a level 43, 44 are parts provided to further enhance the rigidity of the end of the front wheel 27.

A hub 51 is provided for attaching the front wheel 27 with a bolt 52 and a nut 53. An axle 54 supports the hub 51 via bearings 55 and 56 so that the hub can turn. A knuckle 75 is provided to which the axle 54 is attached. A nut 58 is screwed on the axle 54 to fix the bearings 55, 56. A disc 61 is provided for a disc brake with a bolt 62 for attaching the disc 61 to the hub 51. A hole 63 is provided for attaching a swing shaft of the knuckle 57. A tire valve 64 is provided together with a washer 65 for receiving the nut 53.

Figure 3A:
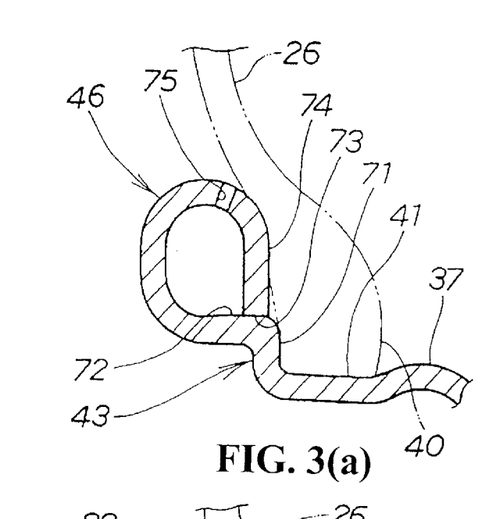
FIGS. 3(a) to 3(f) are sectional views for explaining the main part of the wheel structure according to the first embodiment of the present invention.

FIGS. 3(a) to 3(f) are sectional views for explaining the main part of the wheel structure according to the first embodiment of the present invention. FIG. 3(a) shows the first embodiment and FIGS. 3(b) to 3(f) show transformed examples. In FIGS. 3(a) to 3(f), the structure on one curled side of the rim is respectively shown, the sectional form of the structure on the other curled side being symmetrical with that of the structure on the one curled side and the description is omitted.

As shown in FIG. 3(a), the part having a difference in a level 43 is composed of a flanged rising part 71 formed outside the radius from the bead seat 41 and a large-diameter part 72 as a part the diameter which is made larger than that of the bead seat 41 by extending in a direction of the axle (left in FIG. 3(a)) on the way of the rising part 71.

A curled part 46 is an annular part the end face 73 of which touches with or is located close to a part close to the rising part 71 of the large-diameter part 72 first by bending the side of the end of the large-diameter part 72 outside the radius and next by bending it so that it makes a U-turn. A straight part 74 is provided to the curled part 46 with the straight part touching the side of the bead 40 of the tire. A scupper 75 is provided for draining rainwater in the curled part 46.

Figure 3B:
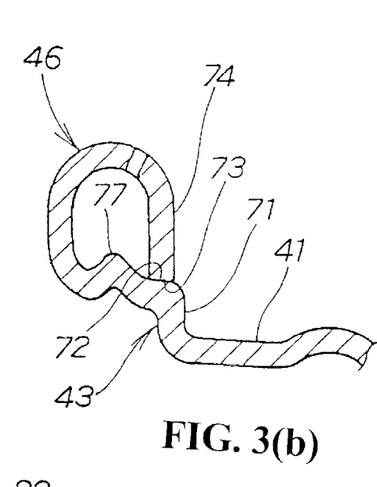

FIG. 3(b) illustrates an example wherein a protrusion 77 is provided for reinforcement that protrudes outside the radius and is annularly formed in the large-diameter part 72 shown in FIG. 3(a).

Figure 3C:
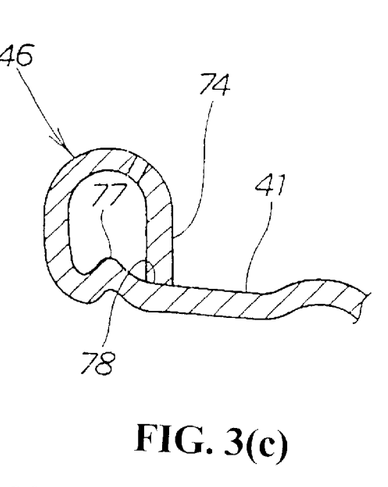

FIG. 3(c) illustrates an example wherein a curled part 46 is formed by curling the side of the end of the bead seat 41 with a protrusion 77 that protrudes outside the radius and is formed in an extended part 78 of the bead seat 41.

Figure 3D:
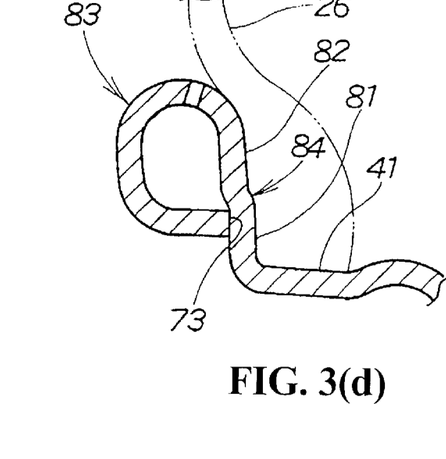

FIG. 3(d) illustrates an example wherein a first flanged rising part 81 is formed by making the bead seat 41 rise outside the radius. A second rising part 82 is formed by bending the outside of the first rising part 81 on the side distant from the mounted tire 26 and extending outside the radius. A curled part 83 is formed by bending the second rising part 82 on the side a further distant from the tire 26 until the second rising part makes a U-turn and then next bending the second rising part on the side of the tire 26 wherein the end face 73 touches to or is located close to the first rising part 81.

An uneven part 84 is formed in the first rising part 81 and the second rising part 82.

Figure 3E:
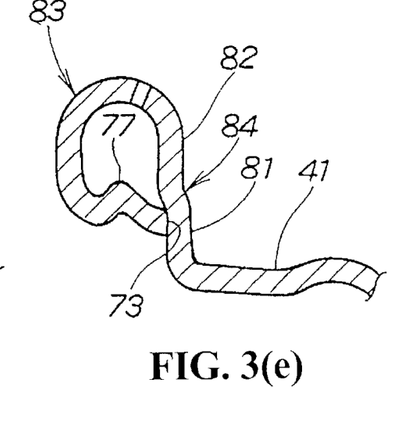

FIG. 3(e) illustrates an example wherein a protrusion 77 protrudes inside and outside the radius and is formed in the curled part 83 shown in FIG. 3(d).

Figure 3F:
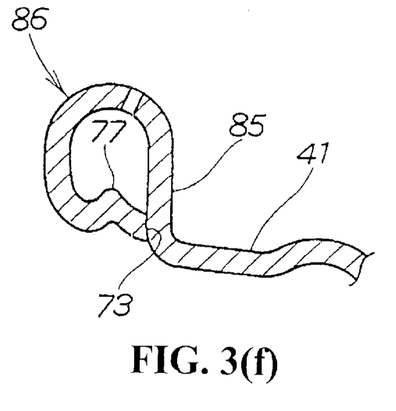

FIG. 3(f) illustrates an example wherein a flanged rising part 85 is formed by making the bead seat 41 rise outside the radius. A curled part 86 is formed by bending the rising part 85 on the side distant from the tire until it makes a U-turn and next by bending the rising part on the side of the tire. A protrusion 77 is formed in the curled part 86 and the end face 73 touches to or is located close to the rising part 85.

Next, the action of the wheel structure described above will be described.

Figure 4A:
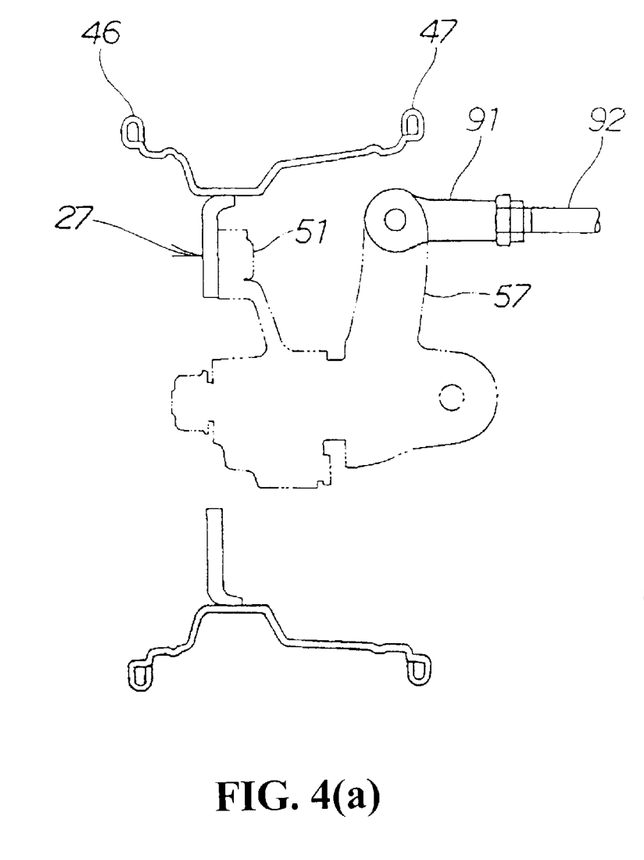
FIGS. 4(a) to 4(b) are explanatory drawings for explaining the action of the wheel structure according to the first embodiment of the present invention.
Figure 4B:
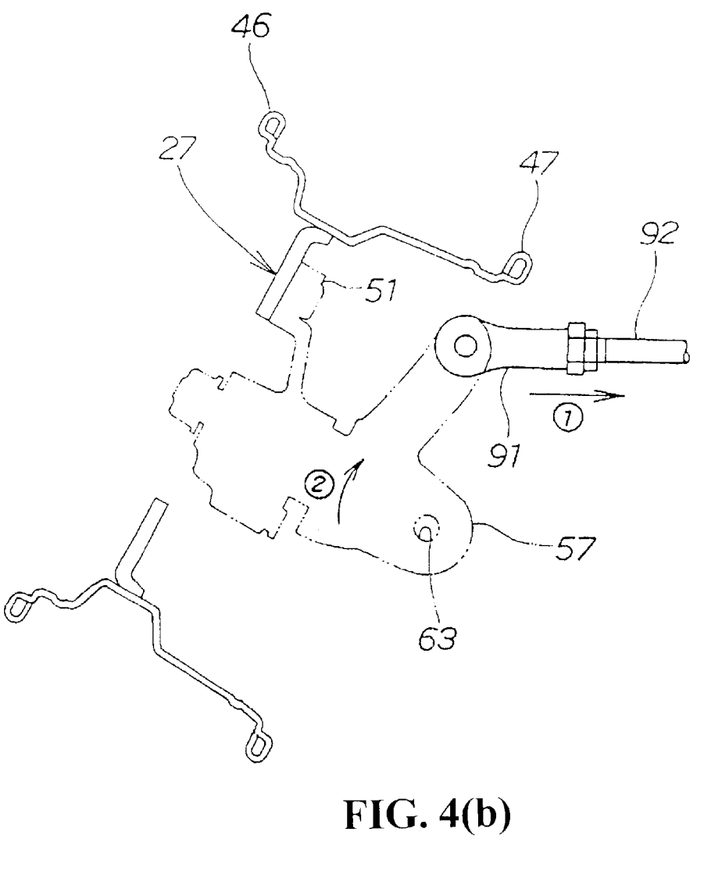

FIGS. 4(a) and 4(b) are explanatory drawings for explaining the action of the wheel structure according to the first embodiment of the present invention.

FIG. 4(a) shows a state in which a tie rod end 91 and a tie rod 92, respectively, on the side of a handlebar are coupled to the front wheel 27 via the hub 51 and the knuckle 57 to steer the front wheel.

As shown in FIG. 4(b), when the handlebar is turned by a predetermined angle, the tie rod 92 and the tie rod end 91, respectively coupled to the handlebar are pulled in a direction shown by an arrow I and as a result, the knuckle 57 is swung in a direction shown by an arrow 2 with a hole 63 for a shaft in the center.

As a result, the front wheel 27 attached to the hub 51 is tilted.

Figure 5A:
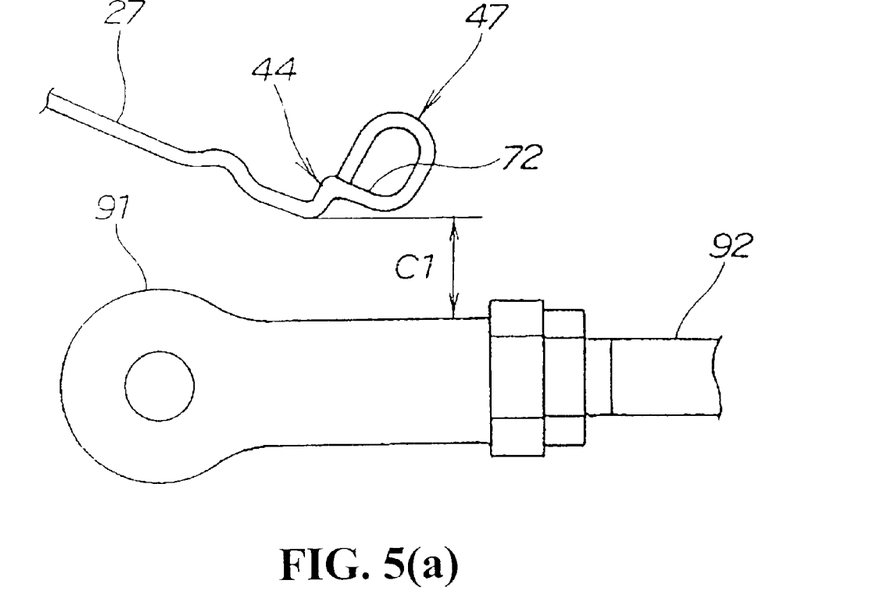
FIGS. 5(a) to 5(b) are explanatory drawings for comparing the action of the wheel structure.
Figure 5B:
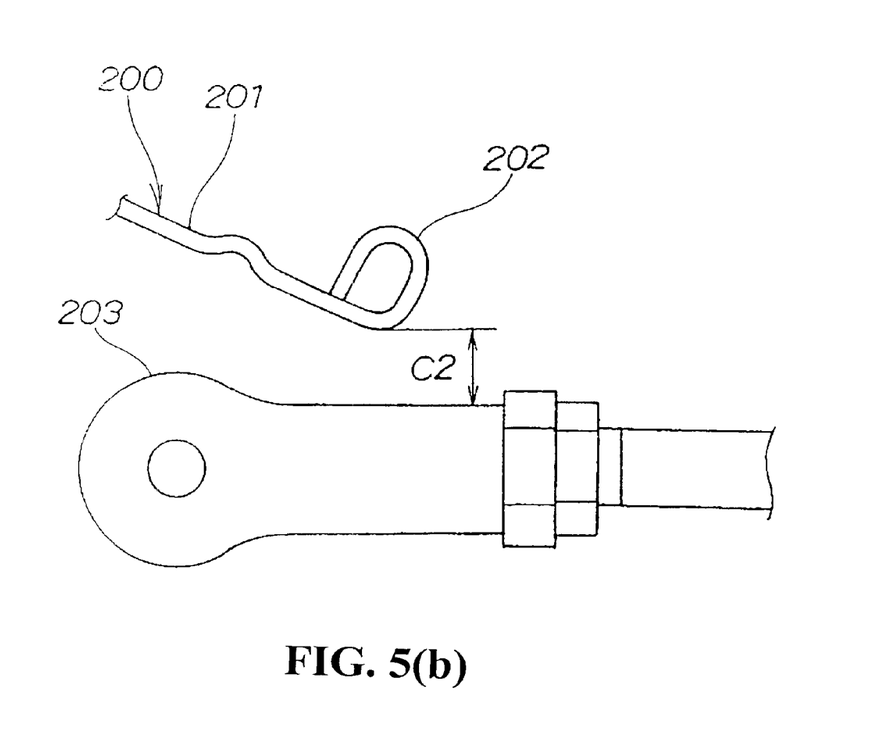

FIGS. 5(a) and 5(b) are explanatory drawings for comparing the action of the wheel structure. FIG. 5(a) is an enlarged view showing the main part of the invention shown in FIG. 4(b) and FIG. 5(b) shows a comparative example.

As shown in FIG. 5(a), C1 shows a distance between the rim of the front wheel 27 and the tie rod end 91.

As shown in FIGS. 5(a) and 5(b), assuming that the distance between a curled part 202 formed at the rim 201 of a wheel 200 and a tie rod end 203 when the handlebar is turned by the same angle (a predetermined angle) as the angle shown in FIG. 4(b) is C2, C1>C2.

That is, in this embodiment, as the large-diameter part 72 is displaced outside the radius because the parts having a difference in a level 43, 44 (see FIG. 2) are provided to the rim of the front wheel 27, the distance C1 can be larger than the distance C2 between the curled part 202 in which no part having a difference in a level is provided as in the comparative example of the wheel 200 and the tie rod end 203 when the handlebar is turned by the predetermined angle.

Therefore, in this embodiment, the handlebar can be further turned until the distance C2 is increased up to the distance C1 and hereby, the maximum steering angle of the front wheel can be increased. Therefore, the minimum turning radius of the vehicle can be reduced and a small turning circle of the vehicle can be reduced.

Figure 6:
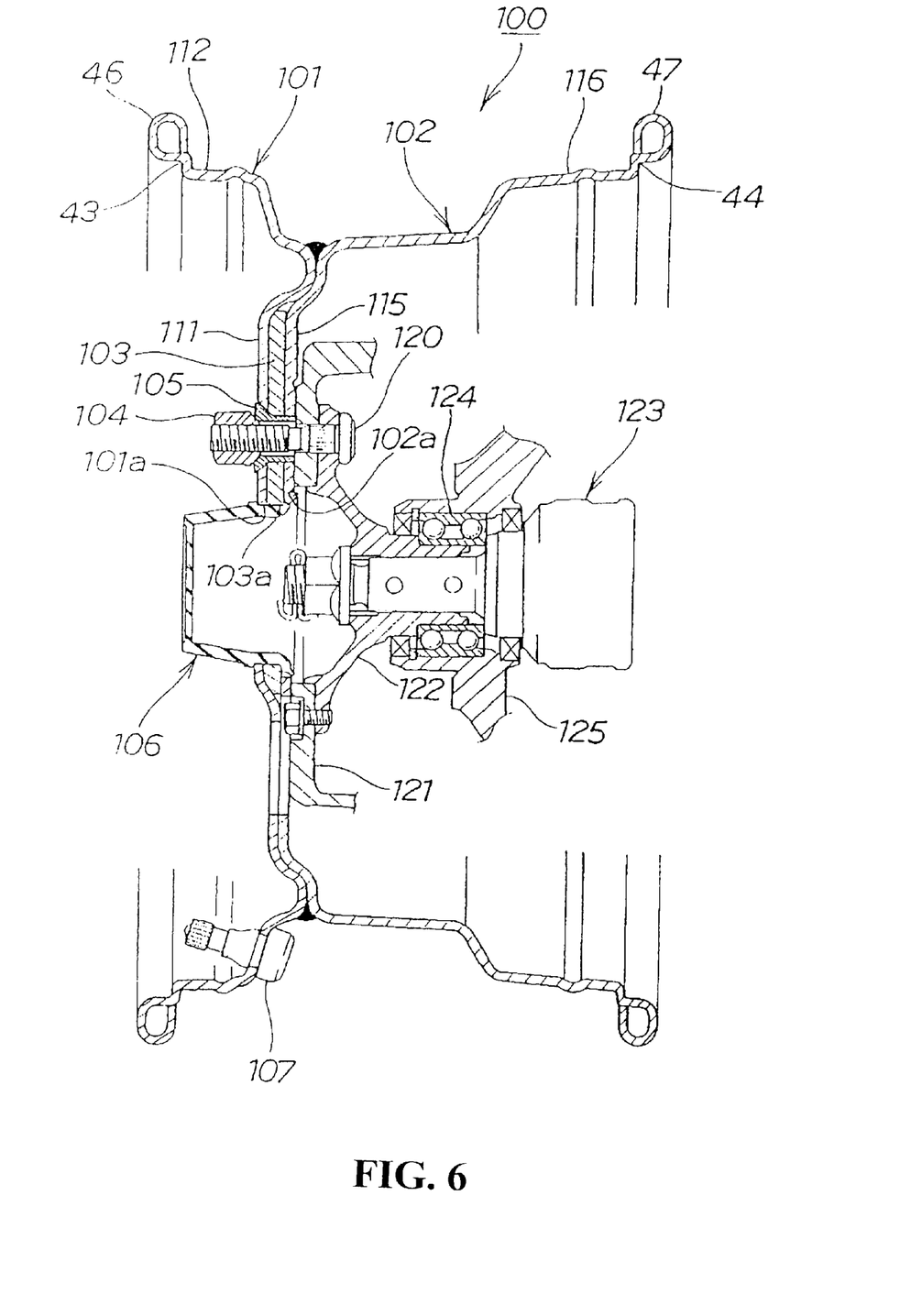
FIG. 6 is a sectional view showing a wheel structure according to a second embodiment of the present invention.

FIG. 6 is a sectional view showing wheel structure according to a second embodiment of the present invention wherein a front wheel 100 is a three-piece wheel composed of a cup-shaped outer wheel 101, a cup-shaped inner wheel 102 connected to the outer wheel 101 by welding, a center plate 103 provided between the outer wheel 101 and the inner wheel 102 with a washer for a nut 105 (only one is shown) for connecting the outer wheel 101. The center plate 103 is provided with the inner wheel 102 for receiving a nut 104 (only one is shown). A center cap 106 is fitted into center holes 101a, 103a, 102a that are made in the respective centers of the outer wheel 101, the center plate 103 and the inner wheel 102 and a tire valve 107.

The outer wheel 101 is composed of an outer disc 111 as a disc with an outer rim 112 connected to the outer disc 111 as a substantially cylindrical rim.

The outer rim 112 has a curled part 46 with a part having a difference in a level 43 as in the first embodiment.

The inner wheel 102 is composed of an inner disc 115 as a disc and an inner rim 116 connected to the inner disc 115 as a substantially cylindrical rim.

The inner rim 116 has a curled part 47 with a part having a difference in a level 44 as in the first embodiment.

A wheel attaching bolt 120, a brake drum 121, a hub 122, a drive shaft 123, a bearing 124 denotes and a knuckle 125 are operatively connected to the wheel 100.

As described in relation to FIGS. 2 and 3(a), the first embodiment of the present invention is based upon the front wheel 27 and the rear wheel 29 (see FIG. 1) respectively formed by the disc 31 and the rim 32 that include a large-diameter part 72 the diameter of which is larger than the diameter in the center that is provided on the edges of the rim 32, respectively, via parts having a difference in a level 43, 44. The curled parts 46, 47 are provided on both edges of the rim 32 by curling the large-diameter part 72 and the respective end faces 73 of the curled parts 46, 47 for touching to the parts having a difference in a level 43, 44.

The rigidity of the side of the edge of the rim 32 can be enhanced by providing the parts having a difference in a level 43, 44 to the rim 32. As a result, the rigidity of the whole front wheel 27 and the whole rear wheel 29 can be enhanced and in addition, as the disc 31 and the rim 32 are not required to be thickened, the weight of the front wheel 27 and the rear wheel 29 can be prevented from being increased.

Also, a tire with an aspect ratio of which is larger can be mounted on the front wheel 27 and the rear wheel 29 with the respective rigidity being enhanced by providing the parts having a difference in a level 43, 44.

Further, a small turning circle of the vehicle can be reduced by providing the parts with a difference in a level 43, 44 as described above.

The second embodiment of the present invention includes a protrusion for reinforcement 77 protruding inside curled parts 46, 47, 83, 86.

The rigidity of a front wheel 27 and a rear wheel 29 can be enhanced by the parts having a difference in a level 43, 44 and the protrusion 77 because of the protrusion for reinforcement 77.

A third embodiment of the present invention is based upon a front wheel 27 and a rear wheel 29, respectively, formed by a disc 31 and a rim 32 and including a protrusion for reinforcement 77 that is formed at the edges of the rim 32 and curled parts 46, 47.

The rigidity of both edges of the rim 32 can be enhanced with a simple structure because the protrusion for reinforcement 77 is formed at the rim 32 and as a result, the rigidity of the whole front wheel 27 and the whole rear wheel 29 can be enhanced.

The shape of the curled part of the present invention is not limited to the reverse shape of a U and may be also circular, rectangular, triangular, semicircular or elliptic.

The present invention produces the following effect owing to the above-mentioned configuration. In the wheel structure according to the present invention, as the larger-diameter part the diameter of which is larger than the diameter in the center is provided to the edges of the rim via the parts having a difference in a level, the curled part is provided to both edges of the rim by curling the larger-diameter part and the end of the curled part touches to the part having a difference in a level. The rigidity of the side of the edge of the rim can be enhanced by providing the parts having a difference in a level to the rim and as a result, the rigidity of the whole wheel can be enhanced. Also, as the disc and the rim are not required to be thickened, the weight of the wheel can be prevented from being increased.

In the wheel structure according to the present invention, as the protrusion for reinforcement protrudes inside the curled part, the rigidity of the wheel can be enhanced by the parts having a difference in a level and the protrusions.

In the wheel structure according to the present invention, as the protrusion for reinforcement and the curled part is formed at the edges of the rim, the rigidity of both edges of the rim can be enhanced by the protrusions and the curled parts with a simple structure and as a result, the rigidity of the whole wheel can be enhanced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wheel structure comprising:
   a rim including a central portion, an inner portion and an outer portion;
   an inner curled portion formed on a terminal end of said inner portion; and
   an outer curled portion formed on a terminal end of said outer portion;
   said central portion being of a first predetermined diameter;
   said inner portion being of a second predetermined diameter;
   said outer portion being of a third predetermined diameter;
   wherein said second predetermined diameter of said inner portion is greater in diameter relative to said third predetermined diameter of said outer portion.

2. The wheel structure according to claim 1, wherein a protrusion for reinforcement is formed within said outer curled portion, said protrusion for reinforcement protruding inside the outer curled portion of said outer portion.

3. The wheel structure according to claim 1, wherein a protrusion for reinforcement is formed within said inner curled portion, said protrusion for reinforcement protruding inside the inner curled portion of said inner portion.

4. The wheel structure according to claim 1, wherein said outer curled portion includes a larger-diameter part, a curled part and a straight part for touching the outer portion for forming the outer curled portion.

5. The wheel structure according to claim 1, wherein said inner curled portion includes a larger-diameter part, a curled part and a straight part for touching the inner portion for forming the inner curled portion.

6. The wheel structure according to claim 4, wherein a protrusion for reinforcement protrudes from the large-diameter part of said outer curled portion and said protrusion being formed inside the curled part of said outer portion.

7. The wheel structure according to claim 5, wherein a protrusion for reinforcement protrudes from the large-diameter part of said inner curled portion and said protrusion being formed inside the curled part of said inner portion.

8. The wheel structure according to claim 1, and further including a opening formed in said outer curled portion for providing drainage for water.

9. A wheel structure comprising:
   an inner wheel including a central portion and an inner portion, said inner portion being of a first predetermined diameter;
   an inner curled portion being formed on an inner surface of said inner wheel;
   an outer wheel including a central portion and an outer portion, said outer portion being of a second predetermined diameter; and
   an outer curled portion being formed on an exterior surface of said outer wheel;
   wherein said first predetermined diameter of said inner portion is greater in diameter relative to the second predetermined diameter of said outer portion.

10. The wheel structure according to claim 9, wherein a protrusion for reinforcement is formed within said outer curled portion, said protrusion for reinforcement protruding inside the outer curled portion of said outer portion.

11. The wheel structure according to claim 9, wherein a protrusion for reinforcement is formed within said inner curled portion, said protrusion for reinforcement protruding inside the inner curled portion of said inner portion.

12. The wheel structure according to claim 9, wherein said outer curled portion includes a larger-diameter part, a curled part and a straight part for touching the outer portion for forming the outer curled portion.

13. The wheel structure according to claim 9, wherein said inner curled portion includes a larger-diameter part, a curled part and a straight part for touching the inner portion for forming the inner curled portion.

14. The wheel structure according to claim 12, wherein a protrusion for reinforcement protrudes from the large-diameter part of said outer curled portion and said protrusion being formed inside the curled part of said outer portion.

15. The wheel structure according to claim 13, wherein a protrusion for reinforcement protrudes from the large-diameter part of said inner curled portion and said protrusion being formed inside the curled part of said inner portion.

16. The wheel structure according to claim 9, and further including a opening formed in said outer curled portion for providing drainage for water.

17. The wheel structure according to claim 9, wherein said inner wheel is jointed to said outer wheel for forming said wheel structure.

18. The wheel structure according to claim 17, and further including a central plate for mounting said inner wheel relative to said outer wheel for forming said wheel structure.

* * * * *